United States Patent
Otsubo et al.

(10) Patent No.: US 10,633,523 B2
(45) Date of Patent: *Apr. 28, 2020

(54) TIRE

(71) Applicant: SUMITOMO RUBBER INDUSTRIES, LTD., Kobe-shi, Hyogo (JP)

(72) Inventors: Shigeki Otsubo, Kobe (JP); Fumiya Kato, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,169

(22) Filed: Apr. 5, 2018

(65) Prior Publication Data

US 2018/0291189 A1  Oct. 11, 2018

(30) Foreign Application Priority Data

Apr. 7, 2017 (JP) ................................. 2017-077084

(51) Int. Cl.
*C08L 9/06* (2006.01)
*B60C 1/00* (2006.01)
*C08K 5/01* (2006.01)

(52) U.S. Cl.
CPC .............. *C08L 9/06* (2013.01); *B60C 1/0016* (2013.01); *C08K 5/01* (2013.01)

(58) Field of Classification Search
CPC ............ B60C 1/0016; C08L 9/06; C08K 5/01
See application file for complete search history.

(56) References Cited

U.S. PATENT DOCUMENTS

| | | | | |
|---|---|---|---|---|
| 2003/0092827 A1* | 5/2003 | Obrecht et al. | ......... | C08L 21/00 524/525 |
| 2017/0267027 A1* | 9/2017 | Kunisawa | ............... | B60C 11/00 |
| 2018/0291190 A1* | 10/2018 | Kato | .................... | B60C 1/0016 |
| 2018/0304686 A1* | 10/2018 | Kato | .................... | B60C 1/0016 |

FOREIGN PATENT DOCUMENTS

| | | | | |
|---|---|---|---|---|
| JP | 2004-137463 A | | 5/2004 | |
| JP | 6351495 B2 | * | 7/2018 | ............. B60C 11/00 |

* cited by examiner

*Primary Examiner* — Nathan M Nutter
(74) *Attorney, Agent, or Firm* — Birch, Stewart, Kolasch & Birch, LLP

(57) ABSTRACT

Provided is a tire comprising a tread composed of a rubber composition, the rubber composition comprising 5 to 100 parts by mass of an aromatic petroleum resin having a weight average molecular weight of 1000 to 5000, based on 100 parts by mass of a rubber component comprising a linear styrene butadiene rubber having a styrene content of 35 to 45% by mass, a vinyl content of 35 to 45% by mass, and a weight average molecular weight of 1,000,000 to 1,400,000.

17 Claims, No Drawings

TIRE

TECHNICAL FIELD

The present invention relates to a tire. More particularly, the present invention relates to a tire having a tread composed of a predetermined rubber composition and having both excellent wear resistance (abrasion resistance) and grip performance.

BACKGROUND OF THE INVENTION

A rubber composition used in a tread is required to have excellent wear resistance. The wear resistance is influenced by glass transition temperature, hardness, filler distribution properties and the like of the rubber composition. For example, JP 2004-137463 A discloses a rubber composition for a tire tread that is designed to improve wear resistance and the like by using a rubber component having a low glass transition temperature.

SUMMARY OF THE INVENTION

However, the tire obtained using the rubber composition described in JP 2004-137463 A has room to improve wear resistance.

An object of the present invention is to provide a tire which has both excellent wear resistance (abrasion resistance) and grip performance.

The present invention for solving the above-mentioned problems mainly includes the following configurations.

(1) A tire comprising a tread composed of a rubber composition, the rubber composition comprising 5 to 100 parts by mass of an aromatic petroleum resin having a weight average molecular weight of 1000 to 5000, based on 100 parts by mass of a rubber component comprising a linear styrene butadiene rubber having a styrene content of 35 to 45% by mass, a vinyl content of 35 to 45% by mass, and a weight average molecular weight of 1,000,000 to 1,400,000.

(2) The tire of (1), wherein the linear styrene butadiene rubber has a 5% by mass toluene solution viscosity of 350 mPa·s or more.

According to the present invention, it is possible to provide a tire having both excellent wear resistance (abrasion resistance) and grip performance.

DETAILED DESCRIPTION

<Tire>

A tire of one embodiment of the present disclosure is a tire comprising a tread composed of a rubber composition, the rubber composition comprising 5 to 100 parts by mass of an aromatic petroleum resin having a weight average molecular weight of 1000 to 5000, based on 100 parts by mass of a rubber component comprising a linear styrene butadiene rubber (linear SBR) having a styrene content of 35 to 45% by mass, a vinyl content of 35 to 45% by mass, and a weight average molecular weight of 1,000,000 to 1,400,000.

As mentioned above, in the rubber composition configuring the tire of the present embodiment, the linear SBR and the aromatic petroleum resin having a low molecular weight are used in combination. That is, the linear SBR is considered to have a large interaction with the aromatic petroleum resin because the linear SBR has few branches. As a result, it is considered that the tire composed of the rubber composition of the present embodiment can suppress the occurrence of abrasion.

(Linear SBR)

The linear SBR of the present embodiment is characterized by having a styrene content of 35 to 45% by mass, a vinyl content of 35 to 45% by mass, and a weight average molecular weight of 1,000,000 to 1,400,000.

In the linear SBR, the styrene content is 35% by mass or more and preferably 37% by mass or more. Further, the styrene content is 45% by mass or less and preferably 43% by mass or less. If the styrene content is less than 35% by mass, the grip performance of the tire tends to deteriorate. On the other hand, if the styrene content exceeds 45% by mass, the initial grip performance tends to deteriorate.

In the linear SBR, the vinyl content is 35% by mass or more and is preferably 37% by mass or more. Further, the vinyl content is 45% by mass or less and preferably 43% by mass or less. If the vinyl content is less than 35% by mass, the grip performance tends to deteriorate. On the other hand, if the vinyl content exceeds 45% by mass, the initial grip performance tends to deteriorate.

The weight average molecular weight (Mw) of the linear SBR is 1,000,000 or more, preferably 1,050,000 or more, and more preferably 1,100,000 or more. The Mw of the linear SBR is 1,400,000 or less, preferably 1,350,000 or less, and more preferably 1,300,000 or less. If the Mw is less than 1,000,000, wear resistance of the tire tends to deteriorate. Meanwhile, if the Mw exceeds 1,400,000, dispersion of carbon or the like becomes difficult, and the wear resistance of the tire tends to deteriorate. In the present embodiment, the Mw can be calculated, for example, in terms of polystyrene as measured by gel permeation chromatography (GPC).

The SBR is not particularly limited. Examples of the SBR include a solution-polymerized SBR (S-SBR), an emulsion-polymerized SBR (E-SBR), a modified SBR (modified S-SBR, modified E-SBR), and the like. The modified SBR is not particularly limited. Examples of the modified SBR include an end-modified or main-chain-modified SBR, a modified SBR coupled with a tin or silicon compound, or the like (such as one having a condensate, a branch structure, etc.), a hydrogenated SBR (hydrogenated S-SBR, hydrogenated E-SBR), and the like. Among these, S-SBR is preferable as the SBR. The SBR may also be oil-extended.

The linear SBR in the present embodiment preferably has a 5% by mass toluene solution viscosity (Tcp) of 350 mPa·s or more, more preferably 370 mPa·s or more, and further preferably 390 mPa·s or more. In the present embodiment, Tcp can be defined as a value determined by dissolving 2.28 g of the rubber component in 50 mL of toluene and then measuring the viscosity of the solution at 25° C. using a standard liquid for viscometer calibration (JIS Z8809), with a Canon-fenske viscometer No. 400.

The content of SBR is preferably 40% by mass or more, and more preferably 50% by mass or more in 100% by mass of the rubber component. It should be noted that the upper limit of the content of SBR is not particularly limited. The content of SBR may be 100% by mass in the rubber component. When the SBR is contained in the above-mentioned content, the obtained tire is excellent in grip performance and wear resistance.

The rubber composition of the present embodiment may be composed of only the linear SBR described above as a rubber component. Alternatively, a rubber component (other rubber components), other than the linear SBR, may be compounded in the rubber composition of the present embodiment. The other rubber components are not particularly limited. Examples of the other rubber components include: isoprene rubbers including a natural rubber (NR)

and polyisoprene rubber (IR); diene-based rubbers other than SBR and butyl-based rubbers such as SBR other than linear SBR, butadiene rubber (BR), styrene isoprene butadiene rubber (SIBR), chloroprene rubber (CR), and acrylonitrile butadiene rubber (NBR) and the like. These rubber components may be used in combination. Among these, NR and BR are preferably used as the other rubber components in the rubber composition of the present embodiment. Thus, the obtained tire can have improved the fuel efficiency, wear resistance, durability, wet grip performance, and the like while maintaining these properties in a balanced manner.

(Aromatic Petroleum Resin)

The aromatic petroleum resin of the present embodiment is characterized in that the Mw thereof is 1000 to 5000, and the content thereof is 5 to 100 parts by mass, based on 100 parts by mass of the rubber component described above.

The kind of aromatic petroleum resin is not particularly limited. Examples of the aromatic petroleum resin include a phenol-based resin, a coumarone indene resin, a terpene resin, a styrene resin, an acrylic resin, a rosin resin, a dicyclopentadiene resin (DCPD resin), and the like. These aromatic petroleum resins may be used in combination. Examples of the phenol-based resin include those manufactured and sold by BASF Corporation, Taoka Chemical Co., Ltd., and the like. Examples of the coumarone indene resin include those manufactured and sold by NITTO CHEMICAL CO., LTD., NIPPON STEEL CHEMICAL CO., LTD., NIPPON PETROCHEMICALS CO., LTD., and the like. An example of the styrene resin is one manufactured and sold by Arizona Chemical Company or the like. Examples of the terpene resin include those manufactured and sold by Arizona Chemical Company, Yasuhara Chemical Co., Ltd, and the like. Among these, the aromatic petroleum resin preferably contains a phenol-based resin, a coumarone indene resin, a terpene resin, or an acrylic resin, and more preferably contains a coumarone indene resin, for the reason that the obtained tire has better grip performance during running.

The Mw of the aromatic petroleum resin is 1000 or more, preferably 1200 or more, and more preferably 1500 or more. The Mw of the aromatic petroleum resin is 5000 or less, preferably 3000 or less, more preferably 2500 or less, and further preferably 2000 or less. If the Mw of the aromatic petroleum resin is less than 1000, the wear resistance of the obtained tire tends to be degraded. On the other hand, if the Mw of the aromatic petroleum resin exceeds 5000, the grip performance of the obtained tire tends to be degraded.

The content of the aromatic petroleum resin is 5 parts by mass or more and preferably 10 parts by mass or more, based on 100 parts by mass of the rubber component. The content of the aromatic petroleum resin is 100 parts by mass or less, preferably 90 parts by mass or less, and more preferably 80 parts by mass or less, based on 100 parts by mass of the rubber component. If the content of the aromatic petroleum resin is less than 5 parts by mass, the grip performance of the tire during running tends to deteriorate. On the other hand, if the content of the aromatic petroleum resin exceeds 100 parts by mass, the tire tends not to show sufficient wear resistance (abrasion resistance).

A softening point of the aromatic petroleum resin is not particularly limited. For example, the softening point is preferably 60° C. or higher, and more preferably 80° C. or higher. The softening point is preferably 170° C. or lower, and more preferably 160° C. or lower. When the softening point is 60° C. or higher, the obtained tire is more likely to exhibit excellent grip performance during running. Further, when the softening point is 170° C. or lower, the obtained tire is more likely to exhibit excellent initial grip performance. In the present embodiment, a softening point, specified by JIS K 6220-1:2001, is measured with a ring and ball softening point measuring device, and such a measured softening point can be defined as a temperature at which a ball drops.

(Optional Components)

Next, a description is given on any optional component which is suitably compounded in the rubber composition configuring the tire of the present embodiment. In addition to the above-mentioned components, other components commonly used in the manufacturing of the rubber composition may be optionally compounded in the rubber composition of the present embodiment. Examples of such optional components include fillers, silane coupling agents, softening agents, stearic acid, zinc oxide, various anti-aging agents, waxes, vulcanization agents, vulcanization accelerators, and the like.

Filler

The filler is not particularly limited. Any one selected from various fillers conventionally used in rubber compositions for tires can be used as the filler. Examples of the filler include carbon black, silica, calcium carbonate, sericite, aluminum hydroxide, magnesium carbonate, titanium oxide, clay, talc, magnesium oxide, and the like. The fillers may be used in combination. Among these, the filler preferably includes at least one inorganic filler selected from the group consisting of carbon black, silica, and aluminum hydroxide, and more preferably includes carbon black, for the reason that the obtained tire can achieve excellent grip performance and wear resistance.

In the case of using carbon black as the filler, the carbon black is not particularly limited. For example, the carbon black may be a general-purpose carbon black or a carbon black manufactured by an oil furnace method. In addition, carbon blacks having different colloidal properties may be used in combination.

A nitrogen adsorption specific surface area ($N_2SA$) of the carbon black is not particularly limited. For example, the $N_2SA$ of the carbon black is preferably 100 ($m^2/g$) or more, more preferably 105 ($m^2/g$) or more, and further preferably 110 ($m^2/g$) or more. The $N_2SA$ of the carbon black is preferably 290 ($m^2/g$) or less, more preferably 270 ($m^2/g$) or less, and further preferably 250 ($m^2/g$) or less. When the $N_2SA$ of carbon black is 100 ($m^2/g$) or more, the obtained tire is more likely to exhibit sufficient grip performance. On the other hand, when the $N_2SA$ of the carbon black is 600 ($m^2/g$) or less, the carbon black is easily dispersed in the rubber composition, whereby the obtained tire is more likely to exhibit sufficient wear resistance. In the present embodiment, the $N_2SA$ can be measured in accordance with JIS K 6217-2:2001.

An oil absorption number (OAN) of the carbon black is not particularly limited. For example, the OAN is preferably 50 mL/100 g or more, and more preferably 100 mL/100 g or more. Further, the OAN is preferably 250 mL/100 g or less, more preferably 200 mL/100 g or less, and further preferably 135 mL/100 g or less. When the OAN is 50 mL/100 g or more, the obtained tire is more likely to exhibit sufficient wear resistance. On the other hand, when the OAN is 250 mL/100 g or less, the obtained tire is more likely to exhibit sufficient grip performance. It should be noted that the OAN of the carbon black can be measured, for example, in accordance with JIS K6217-4 2008.

When silica is used as the filler, the silica is not particularly limited. Examples of the silica may include wet silica (hydrated silicic acid), dry silica (anhydrous silicic acid), calcium silicate, aluminum silicate, and the like. Among these, the silica is preferably wet silica. These kinds of silica may be used in combination.

A nitrogen adsorption specific surface area ($N_2SA$) of silica is not particularly limited. For example, the $N_2SA$ of silica is preferably 80 ($m^2/g$) or more, more preferably 100 ($m^2/g$) or more, and further preferably 110 ($m^2/g$) or more. The $N_2SA$ of silica is preferably 250 ($m^2/g$) or less, more preferably 235 ($m^2/g$) or less, and further preferably 220 ($m^2/g$) or less. When the $N_2SA$ of silica is 80 ($m^2/g$) or more, the obtained tire is more likely to obtain sufficient durability. Further, when the $N_2SA$ of the silica is 250 ($m^2/g$) or less, the silica is easily dispersed in the rubber composition, so that the rubber composition can be easily processed. In the present embodiment, the $N_2SA$ of silica can be measured by the BET method in accordance with ASTM D3037-81.

In the rubber composition of the present embodiment, the content of the filler is preferably 10 parts by mass or more, and more preferably 30 parts by mass or more, based on 100 parts by mass of the rubber component. In addition, the content of the filler is preferably 180 parts by mass or less, and more preferably 150 parts by mass or less, based on 100 parts by mass of the rubber component. By compounding the filler in the rubber composition at such a compounding ratio, the obtained tire is more likely to achieve both excellent grip performance and wear resistance.

Silane Coupling Agent

When silica is used as the filler, silica and a silane coupling agent are preferably used in combination. The silane coupling agent is not particularly limited. The silane coupling agent may be any silane coupling agent that is conventionally used in conjunction with silica in the rubber industry. Examples of the silane coupling agent include sulfide-based silane coupling agents, such as bis(3-triethoxysilylpropyl) disulfide, and bis(3-triethoxysilylpropyl) tetrasulfide; mercapto-based silane coupling agents, such as 3-mercaptopropyltrimethoxysilane, and a mercapto-based coupling agent, manufactured and sold by Momentive Performance Materials (a silane coupling agent having a mercapto group); vinyl-based silane coupling agents, such as vinyltriethoxysilane; amino-based silane coupling agents, such as 3-aminopropyltriethoxysilane; glycidoxy-based silane coupling agents, such as γ-glycidoxypropyltriethoxysilane; nitro-based silane coupling agents, such as 3-nitropropyltrimethoxysilane; and chloro-based silane coupling agents, such as 3-chloropropyltrimethoxysilane. These silane coupling agents may be used in combination.

When the silane coupling agent is used in combination with silica, the content of the silane coupling agent is preferably 4.0 parts by mass or more, and more preferably 6.0 parts by mass or more, based on 100 parts by mass of silica. The content of the silane coupling agent is preferably 12 parts by mass or less, and more preferably 10 parts by mass or less, based on 100 parts by mass of silica. When the content of the silane coupling agent is 4.0 parts by mass or more, the dispersibility of the filler in the rubber composition can be improved. Further, when the content of the silane coupling agent is 12 parts by mass or less, the filler is satisfactorily dispersed in the rubber composition, which makes it possible to easily improve the reinforcing property of the obtained tire.

Softening Agent

The softening agent is not particularly limited. Any one selected from various softening agents conventionally used in rubber compositions for tires can be used as the softening agent. For example, the softening agent may be an oil, a liquid polymer, or the like.

The oil is not particularly limited. Examples of the oil include mineral oil, such as naphthene oil, aroma oil, process oil, and paraffin oil. These oils may be used in combination.

When oil is contained, the content of the oil is not particularly limited. For example, the oil content is preferably 0.5 parts by mass or more, and more preferably 1.0 part by mass or more, based on 100 parts by mass of the rubber component. Further, the content of the oil is preferably 50 parts by mass or less, and more preferably 45 parts by mass or less, based on 100 parts by mass of the rubber component. When the oil content is within the above range, the obtained tire has excellent wear resistance.

The liquid polymer is not particularly limited. Examples of the liquid polymer include a liquid styrene butadiene polymer, a liquid butadiene polymer, a liquid isoprene polymer, a liquid styrene isoprene polymer, and the like. These liquid polymers may also be used in combination. Among these, the liquid polymer is preferably a styrene butadiene polymer because the obtained tire can easily achieve both grip performance and durability in a balanced manner.

The Mw of the styrene butadiene polymer is preferably 30,000 or less, and more preferably 20,000 or less. The Mw of the styrene butadiene polymer is preferably 3000 or more, and more preferably 5000 or more. When the Mw of the styrene butadiene polymer is within the above range, the obtained tire can easily achieve both grip performance and the wear resistance in a balanced manner.

The styrene butadiene polymer is preferably a hydrogenated styrene butadiene polymer, to which hydrogen is added. As a result, the obtained tire can easily achieve both wear resistance and grip performance in a balanced manner. The hydrogenation rate of the styrene butadiene polymer is not particularly limited. For example, the hydrogenation rate of the styrene butadiene polymer is 50% or more.

When the liquid polymer is contained, the content of the liquid polymer is not particularly limited. For example, the content of the liquid polymer is preferably 5 parts by mass or more, and more preferably 15 parts by mass or more, based on 100 parts by mass of the rubber component. In addition, the content of the liquid polymer is preferably 50 parts by mass or less, and more preferably 45 parts by mass or less, based on 100 parts by mass of the rubber component. When the content of the liquid polymer is within the above range, the obtained tire has excellent wear resistance.

Anti-aging Agent

The anti-aging agent is not particularly limited. Any one selected from various anti-aging agents conventionally used in rubber compositions for tires can be used as the anti-aging agent. Examples of the anti-aging agent include quinoline-based antiaging agents, quinone-based antiaging agents, phenol-based antiaging agents, phenylenediamine-based antiaging agents, and the like. These antiaging agents may be used in combination.

When the anti-aging agent is contained, the content of the antiaging agent is not particularly limited. For example, the content of the anti-aging agent is preferably 0.5 parts by mass or more, and more preferably 0.8 parts by mass or more, based on 100 parts by mass of the rubber component. In addition, the content of the anti-aging agent is preferably 5.0 parts by mass or less, more preferably 3.0 parts by mass or less, and further preferably 2.5 parts by mass or less, based on 100 parts by mass of the rubber component. When the content of the anti-aging agent is within the above range, the filler is easily dispersed. The obtained rubber composition is easily kneaded.

Vulcanization Agent

The vulcanization agent is not particularly limited. Examples of the vulcanization agent include sulfur, sulfur-containing compounds, such as caprolactam disulfide, and the like. Examples of sulfur as the vulcanization agent include powder sulfur, precipitated sulfur, colloidal sulfur, insoluble sulfur, oil-treated sulfur, and the like. These vulcanization agents may be used in combination.

The content of the vulcanization agent is not particularly limited. For example, the content of the vulcanization agent is preferably 0.5 parts by mass or more, and more preferably 0.6 parts by mass or more, based on 100 parts by mass of the rubber component. The content of the vulcanization agent is preferably 3 parts by mass or less, and more preferably 2 parts by mass or less, based on 100 parts by mass of the rubber component. When the content of the vulcanization agent is 0.5 parts by mass or more, a good vulcanization reaction is more likely to proceed in the rubber composition. In addition, when the content of the vulcanization agent is 3 parts by mass or less, the obtained tire can easily achieve both grip performance and wear resistance in a balanced manner.

Vulcanization Accelerator

The vulcanization accelerator is not particularly limited. Examples of the vulcanization accelerator include guanidine-based vulcanization accelerators, aldehyde-amine-based vulcanization accelerators, aldehyde-ammonia-based vulcanization accelerators, thiazole-based vulcanization accelerators, sulfenamide-based vulcanization accelerators, thiourea-based vulcanization accelerators, thyraum-based vulcanization accelerators, ditiocarbamate-based vulcanization accelerators, sandate-based vulcanization accelerators, and the like. Among these, the vulcanization accelerator is preferably a vulcanization accelerator having a benzothiazolyl sulfide group for the reason that the obtained tire can easily achieve both grip performance and wear resistance in a balanced manner.

The vulcanization accelerator having the benzothiazolyl sulfide group is not particularly limited. Examples of the vulcanization accelerator having the benzothiazolyl sulfide group include sulfonamide-based vulcanization accelerators, such as N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), N,N-diisopropyl-2-benzothiazolesulfenamide, N,N-di(2-ethylhexyl)-2-benzothiazolylsulfenamide (BEHZ), N,N-di(2-methylhexyl)-2-benzothiazolylsulfenamide (BMHZ), and N-ethyl-N-t-butylbenzothiazole-2-sulfenamide (ETZ); N-tert-butyl-2-benzothiazolylsulfenimide (TBSI); di-2-benzothiazolyl disulfide (DM); and the like.

The content of the vulcanization accelerator is not particularly limited. For example, the content of the vulcanization accelerator is preferably 0.5 parts by mass or more, and more preferably 1.0 parts by mass or more, based on 100 parts by mass of the rubber component. The content of the vulcanization accelerator is preferably 10 parts by mass or less, and more preferably 5 parts by mass or less, based on 100 parts by mass of the rubber component. When the content of the vulcanization accelerator is 0.5 parts by mass or more, the rubber composition tends to gain a sufficient vulcanization rate during vulcanization. Further, when the content of the vulcanization accelerator is 10 parts by mass or less, the obtained tire is less susceptible to blooming.

<Method for Manufacturing Tire>

A tire of the present embodiment can be manufactured by a general method using the rubber composition (rubber composition for treads). The rubber composition can also be manufactured by a general method. For example, the rubber composition is manufactured by kneading the above-mentioned respective components, other than a vulcanization agent and a vulcanization accelerator, with a known kneading machine commonly used in the rubber industry, such as a Banbury mixer, a kneader, or an open roll, and then adding the vulcanization agent and the vulcanization accelerator thereto, followed by further kneading a mixture.

Then, the tire of the present embodiment can be manufactured by extruding and forming the above-mentioned rubber composition along the shape of each tire member (for example, the shape of the tread portion) at the stage of unvulcanization, laminating the extruded product with other tire members on a tire molding machine, then performing molding in a general-purpose method to obtain an unvulcanized tire, and subsequently heating and pressurizing the obtained tire in a vulcanizer.

In the above, one embodiment of the present disclosure is described. The present disclosure is not particularly limited to the above embodiment. It should be noted that the above embodiment mainly describes a disclosure having the following constitutions.

(1) A tire comprising a tread composed of a rubber composition, the rubber composition comprising 5 to 100 parts by mass, preferably 10 to 90 parts by mass, more preferably 10 to 80 parts by mass of an aromatic petroleum resin having a weight average molecular weight of 1000 to 5000, preferably 1200 to 3000, more preferably 1500 to 2500, based on 100 parts by mass of a rubber component comprising a linear styrene butadiene rubber having a styrene content of 35 to 45% by mass, preferably 37 to 43% by mass, a vinyl content of 35 to 45% by mass preferably 37 to 43% by mass, and a weight average molecular weight of 1,000,000 to 1,400,000, preferably 1,050,000 to 1,350,000, more preferably 1,100,000 to 1,300,000.

(2) The tire of (1), wherein the linear styrene butadiene rubber has a 5% by mass toluene solution viscosity of 350 mPa·s or more, preferably 370 mPa·s or more, more preferably 390 mPa·s or more.

EXAMPLES

The present disclosure is described in detail based on Examples. The present disclosure is not limited to these Examples.

Various chemicals used in Examples and Comparative Examples are shown below.
(Rubber Component)
SBR1: linear SBR prepared by a manufacturing method for SBR1 described below (oil extended (including 37.5 parts by mass of oil based on 100 parts by mass of a rubber solid), styrene content: 40% by mass, vinyl content: 40% by mass, Mw: 1,200,000, 5% by mass toluene solution viscosity: 390 mPa·s)
SBR2: branched SBR prepared by a manufacturing method for SBR2 described below (oil extended (including 37.5 parts by mass of oil based on 100 parts by mass of a rubber solid), styrene content: 40% by mass, vinyl content: 40% by mass, weight average molecular weight: 1,200,000, 5% by mass toluene solution viscosity: 340 mPa·s)
(Aromatic Petroleum Resin)
Resin 1: Neopolymer L-90 (manufactured by JX Oil & Energy Corporation, Mw: 1100, softening point: 95° C.)
Resin 2: Neopolymer 140 (manufactured by JX Oil & Energy Corporation, Mw: 2100, softening point: 145° C.)
Resin 3: Neopolymer 170S (manufactured by JX Oil & Energy Corporation, Mw: 3000, softening point: 160° C.)

Resin 4: Neopolymer E-100 (manufactured by JX Oil & Energy Corporation, Mw: 800, softening point: 90° C.)
Resin 5: Neopolymer 160 (manufactured by JX Oil & Energy Corporation, Mw: 3500, softening point: 165° C.)
(Others)
Carbon Black: N219 (manufactured by Cabot Japan K.K., $N_2SA$: 106 $m^2/g$)
Liquid SBR: styrene content of 50% by mass, Mw: 6000, hydrogenation rate: 70%
Anti-aging Agent: Nocrack 6C (manufactured by Ouchi Shinko Chemical Industrial Co., Ltd.)
Wax: Ozoace 355 (manufactured by Japan Seiro Corporation) Stearic acid: bead stearic acid TSUBAKI (manufactured by NOF Corporation)
Zinc oxide: two types of zinc oxide (manufactured by MITSUI MINING & SMELTING CO., LTD)
Sulfur: powder sulfur (manufactured by Karuizawa Sulfur Co., Ltd., vulcanization agent)
Accelerator DM: NOCCELER DM (manufactured by Ouchi Shinko Chemical Industrial Co., Ltd., vulcanization accelerator)
Accelerator TOT: NOCCELER TOT-N (tetrakis(2-ethylhexyl)thiuram disulfide, manufactured by Ouchi Shinko Chemical Industrial Co., Ltd., vulcanization accelerator)
CLD80: Accelerator (manufactured by Rhein Chemie Corp.)

Various chemicals used in the manufacturing methods for SBR1 and SBR2 are as follows.
Cyclohexane: manufactured by Kanto Chemical Co., Inc.
Pyrolidine: manufactured by Kanto Chemical Co., Inc.
Divinylbenzene: manufactured by Sigma-Aldrich Corporation
1.6M n-butyllithium hexane solution: manufactured by Kanto Chemical Co., Inc.
Isopropanol: manufactured by Kanto Chemical Co., Inc.
Styrene: manufactured by Kanto Chemical Co., Inc.
Butadiene: manufactured by Takachiho Chemical Industrial Co., Ltd.
Tetramethylethylenediamine: N, N, N', N'-tetramethylethylenediamine, manufactured by Kanto Chemistry Co., Inc.

<Production Method of SBR1>

A 3 L pressure-resistant stainless-steel vessel, fully nitrogen-purged, was charged with 1000 g of hexane, 60 g of butadiene, 40 g of styrene, and 20 mmol of TMEDA. Subsequently, a small amount of n-butyllithium/hexane solution was put into the polymerization vessel as a scavenger for previously neutralizing impurities that would affect deactivation of a polymerization initiator. Further, an n-butyllithium/hexane solution (in which the content of n-butyllithium was 0.083 mmol) was added thereto, followed by polymerization reaction for three hours at 50° C. Then, 1500 mL of 1M isopropanol/hexane solution was added dropwise to the resulting mixture to terminate the reaction. Thereafter, the polymerization solution was evaporated for 24 hours at room temperature and further dried for 24 hours at 80° C. under reduced pressure, thereby producing an SBR1.

<Production Method of SBR2>

A 3 L pressure-resistant stainless-steel vessel, fully nitrogen-purged, was charged with 1000 g of hexane, 60 g of butadiene, 40 g of styrene and 20 mmol of TMEDA. Subsequently, a small amount of n-butyllithium/hexane solution was put into the polymerization vessel as a scavenger for previously neutralizing impurities that would affect deactivation of a polymerization initiator. Further, an n-butyllithium/hexane solution (in which the content of n-butyllithium was 0.332 mmol) was added thereto, followed by polymerization reaction for three hours at 50° C. Then, 0.083 mmol of tetrachlorosilane was added to the resulting mixture. Subsequently, 1500 mL of 1M isopropanol/hexane solution was added dropwise to the mixture to terminate the reaction. Thereafter, the polymerization solution was evaporated for 24 hours at room temperature and further dried for 24 hours at 80° C. under reduced pressure, thereby producing an SBR2.

Examples 1 to 5 and Comparative Examples 1 to 9

According to the compounding formulations shown in Table 1 below, all chemicals, other than a vulcanization agent and a vulcanization accelerator, were kneaded using a 1.7 L sealed Banbury mixer for five minutes up to a discharge temperature of 170° C. to obtain a kneaded product. Then, the obtained kneaded product was kneaded again (remilled) at a discharge temperature of 150° C. for four minutes by the Banbury mixer. Then, a vulcanization agent and a vulcanization accelerator were added to the obtained kneaded product using a biaxial open roll, and kneaded for 4 minutes up to 105° C. to obtain an unvulcanized rubber composition. The obtained unvulcanized rubber composition was extruded and molded into the shape of a tire tread by an extruder equipped with a base having a predetermined shape, and then laminated with other tire members to form an unvulcanized tire, which was then press-vulcanized at 170° C. for 12 minutes to manufacture a test tire (size: 195/65R15). The obtained test tires were evaluated for the wear resistance (abrasion resistance) and grip performance according to the following evaluation methods. The results are shown in Table 1.

<Abrasion Resistance>

The respective test tires were mounted on all wheels of a domestic FR vehicle with a displacement 2000 cc, and after running a distance of 8000 km, a groove depth of a tire tread portion was measured. Then, a running distance when the tire groove depth was reduced by 1 mm was measured. The result of each of the test tires is indicated by an index, assuming that a running distance when a tire groove of Comparative Example 1 was reduced by 1 mm is 100. It shows that the larger the index, the better the abrasion resistance becomes.

<Grip Performance>

The respective test tires were mounted on all wheels of a domestic FR vehicle with a displacement 2000 cc, and the vehicle was actually run 10 times on a test course with a dry asphalt road surface. The stability of control at that time was evaluated by a test driver. The result of each of the test tires is indicated by an index, assuming that the stability of Comparative Example 1 is 100. It shows that the larger the index, the higher the grip performance becomes.

TABLE 1

|  | Example | | | | | Comparative Example | | | | | | | | |
| --- | --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 | 9 |
| SBR1 | 137.5 | 137.5 | 137.5 | 137.5 | 137.5 | — | — | — | 137.5 | — | — | 137.5 | — | — |
| SBR2 | — | — | — | — | — | 137.5 | 137.5 | 137.5 | — | 137.5 | 137.5 | — | 137.5 | 137.5 |
| Resin 1 | 20 | — | — | — | — | 20 | — | — | — | — | — | 3 | 3 | — |
| Resin 2 | — | 20 | — | — | — | — | 20 | — | — | — | — | — | — | — |
| Resin 3 | — | — | 20 | 60 | 100 | — | — | 20 | 120 | — | — | — | — | 120 |
| Resin 4 | — | — | — | — | — | — | — | — | — | 20 | — | — | — | — |
| Resin 5 | — | — | — | — | — | — | — | — | — | — | 20 | — | — | — |
| Carbon | 95 | 95 | 95 | 95 | 95 | 95 | 95 | 95 | 95 | 95 | 95 | 95 | 95 | 95 |
| Liquid SBR | 34.5 | 34.5 | 34.5 | 34.5 | 34.5 | 34.5 | 34.5 | 34.5 | 34.5 | 34.5 | 34.5 | 34.5 | 34.5 | 34.5 |
| Anti-aging agent | 2.5 | 2.5 | 2.5 | 2.5 | 2.5 | 2.5 | 2.5 | 2.5 | 2.5 | 2.5 | 2.5 | 2.5 | 2.5 | 2.5 |
| Wax | 1 | 1 | 1 | 1 | 1 | 1 | 1 | 1 | 1 | 1 | 1 | 1 | 1 | 1 |
| Stearic acid | 1.5 | 1.5 | 1.5 | 1.5 | 1.5 | 1.5 | 1.5 | 1.5 | 1.5 | 1.5 | 1.5 | 1.5 | 1.5 | 1.5 |
| Zinc oxide | 2.1 | 2.1 | 2.1 | 2.1 | 2.1 | 2.1 | 2.1 | 2.1 | 2.1 | 2.1 | 2.1 | 2.1 | 2.1 | 2.1 |
| Sulfur | 1 | 1 | 1 | 1 | 1 | 1 | 1 | 1 | 1 | 1 | 1 | 1 | 1 | 1 |
| Accelerator DM | 3 | 3 | 3 | 3 | 3 | 3 | 3 | 3 | 3 | 3 | 3 | 3 | 3 | 3 |
| Accelerator TOT | 5 | 5 | 5 | 5 | 5 | 5 | 5 | 5 | 5 | 5 | 5 | 5 | 5 | 5 |
| CLD80 | 1.5 | 1.5 | 1.5 | 1.5 | 1.5 | 1.5 | 1.5 | 1.5 | 1.5 | 1.5 | 1.5 | 1.5 | 1.5 | 1.5 |
| Abrasion resistance | 160 | 140 | 130 | 115 | 100 | 100 | 85 | 70 | 80 | 70 | 75 | 160 | 140 | 80 |
| Grip performance | 110 | 120 | 130 | 150 | 170 | 100 | 105 | 110 | 170 | 70 | 80 | 60 | 60 | 100 |

As shown in Table 1, all tires of Examples 1 to 5 in the present disclosure exhibited better abrasion resistance and grip performance than the tire of Comparative Example 1. In addition, it was considered that the grip performance was improved while maintaining the abrasion resistance by using 30 parts or more of the liquid SBR having a hydrogenation rate of 50% or more and a Mw of 30,000 or less in combination.

The invention claimed is:

1. A tire comprising a tread composed of a rubber composition, the rubber composition comprising 5 to 100 parts by mass of an aromatic petroleum resin having a weight average molecular weight of 1000 to 5000, based on 100 parts by mass of a rubber component comprising a linear styrene butadiene rubber having a styrene content of 35 to 45% by mass, a vinyl content of 35 to 45% by mass, and a weight average molecular weight of 1,000,000 to 1,400,000,
   wherein the linear styrene butadiene rubber has a 5% by mass toluene solution viscosity of 350 mPa·s or more.

2. The tire of claim 1, wherein the weight average molecular weight of the linear styrene butadiene rubber is 1,050,000 to 1,400,000.

3. The tire of claim 1, wherein the weight average molecular weight of the linear styrene butadiene rubber is 1,100,000 to 1,400,000.

4. The tire of claim 1, wherein the vinyl content of the linear styrene butadiene rubber is 35 to 43% by mass.

5. The tire of claim 1, wherein the vinyl content of the linear styrene butadiene rubber is 37 to 45% by mass.

6. The tire of claim 1, wherein a softening point of the linear styrene butadiene rubber is 60 to 170° C.

7. The tire of claim 1, wherein the rubber composition further comprises a softening agent,
   the softening agent comprises at least one selected from the group consisting of an oil and a liquid polymer.

8. The tire of claim 1, wherein the rubber composition further comprises a liquid polymer,
   wherein the liquid polymer comprises at least one selected from the group consisting of a liquid styrene butadiene polymer, a liquid butadiene polymer, a liquid isoprene polymer and a liquid styrene isoprene polymer.

9. The tire of claim 1, wherein the linear styrene butadiene rubber comprises at least one selected from the group consisting of a solution-polymerized styrene butadiene rubber, an emulsion-polymerized styrene butadiene rubber and a modified styrene butadiene rubber.

10. The tire of claim 1, wherein the rubber composition further comprises a filler,
    wherein the filler comprises a carbon black, and
    a nitrogen adsorption specific surface area of the carbon black is 100 to 290 (m$^2$/g).

11. The tire of claim 1, wherein the rubber composition further comprises 10 to 180 parts by mass of a filler based on 100 parts by mass of the rubber component.

12. The tire of claim 1, wherein a softening point of the aromatic petroleum resin is 60 to 170° C.

13. The tire of claim 1, wherein the aromatic petroleum resin comprises at least one selected from the group consisting of a phenol-based resin, a coumarone indene resin, a terpene resin and an acrylic resin.

14. The tire of claim 1, wherein the content of the aromatic petroleum resin is 10 to 90 parts by mass based on 100 parts by mass of the rubber component.

15. The tire of claim 1, wherein the rubber composition further comprises a vulcanization accelerator,
    wherein the vulcanization accelerator comprises a vulcanization accelerator having a benzothiazolyl sulfide group.

16. The tire of claim 1, wherein the rubber composition further comprises a vulcanization accelerator,
    wherein the vulcanization accelerator comprises tetrakis (2-ethylhexyl)thiuram disulfide.

17. The tire of claim 1, wherein the rubber composition further comprises a vulcanization agent,
    wherein the vulcanization agent comprises caprolactam disulfide.

* * * * *